July 22, 1941.   E. C. LE MUNYON   2,249,838
ELECTRICAL VEHICLE
Filed Dec. 13, 1938   3 Sheets-Sheet 1
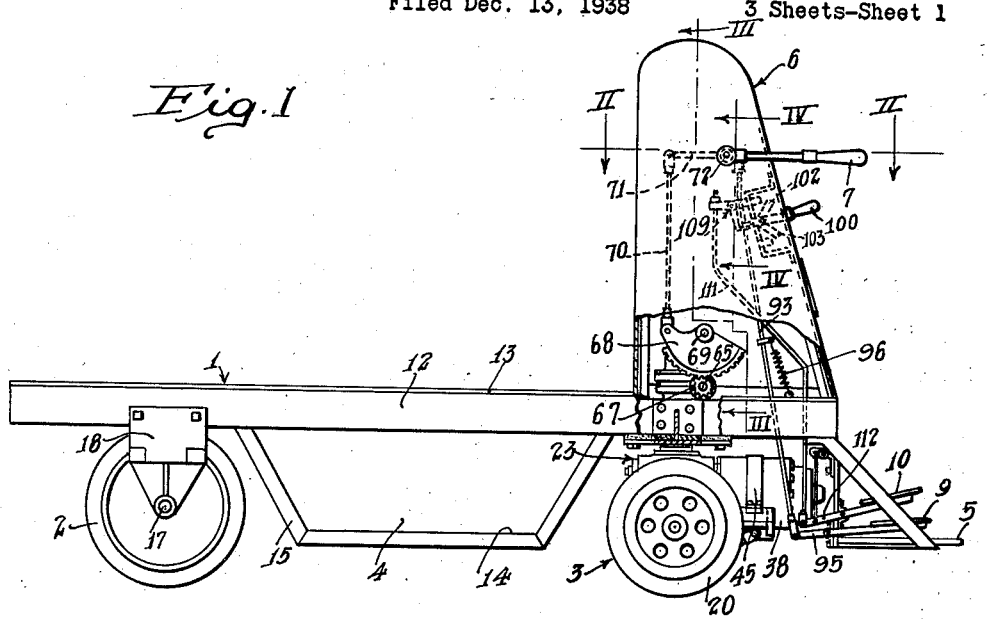
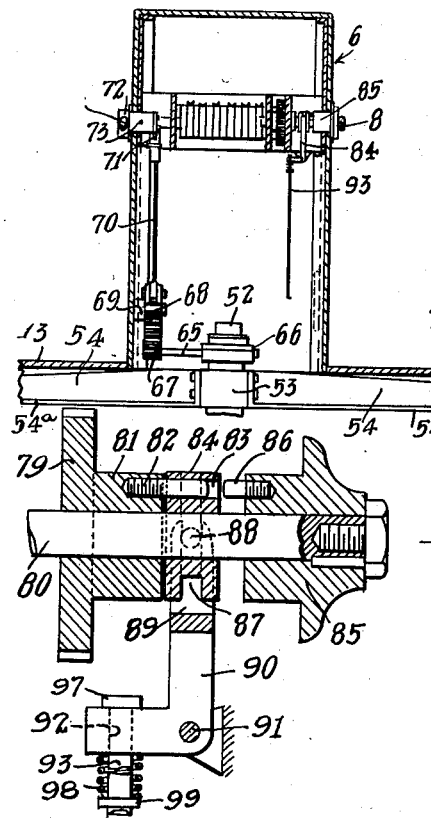
Inventor
Ethan C. Le Munyon
By Lyon & Lyon
Attorneys July 22, 1941.   E. C. LE MUNYON   2,249,838
ELECTRICAL VEHICLE
Filed Dec. 13, 1938   3 Sheets-Sheet 2

Inventor
Ethan C. Le Munyon
By Lyon & Lyon
Attorneys

July 22, 1941. E. C. LE MUNYON 2,249,838
ELECTRICAL VEHICLE
Filed Dec. 13, 1938 3 Sheets-Sheet 3

Inventor
Ethan C. Le Munyon
By Lyon & Lyon
Attorneys

Patented July 22, 1941

2,249,838

UNITED STATES PATENT OFFICE 2,249,838

ELECTRICAL VEHICLE

Ethan C. Le Munyon, Los Angeles, Calif.

Application December 13, 1938, Serial No. 245,404

3 Claims. (Cl. 180—54)

This invention relates to power vehicles and particularly to small electrically propelled vehicles adapted to be operated over relatively smooth roads or floors, and at relatively low speeds. It is especially adapted for freight trucks, such as are used within factories, or on decks or railroad platforms, and for small, open, passenger vehicles, such as are used on boardwalks, and the like, for sight-seers.

An object of the invention is to provide a simple and inexpensive, yet reliable and rugged, electrically propelled vehicle of the type referred to.

Another object is to provide a safe, convenient and foolproof control system for vehicles of the type referred to.

Other more specific objects and features of the invention will become apparent from the detailed description, with reference to the drawings, of a specific embodiment of the invention, which follows:

In the drawings:

Fig. 1 is a side elevation view of a truck in accordance with the invention, certain portions being broken away to show details of the internal construction;

Fig. 2 is a horizontal sectional view, taken substantially in the plane II—II of Fig. 1;

Fig. 3 is a detail vertical section taken substantially in the plane III—III of Fig. 1;

Fig. 4 is an enlarged vertical sectional view of a clutch employed in the control mechanism of the truck, the view being taken substantially in the plane IV—IV of Fig. 1;

Figure 7:
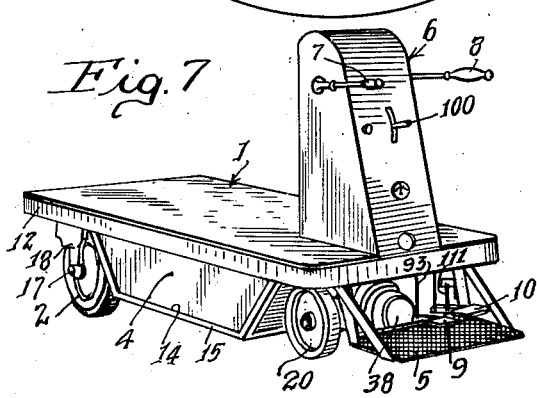
Fig. 7 is a perspective view of the complete truck.

Referring first to Figs. 1 and 7, the freight truck therein depicted comprises a relatively low body 1 supported at the rear end on a pair of relatively widely spaced nondirigible rear wheels 2 and supported at the forward end by a dirigible front wheel assembly 3, the latter assembly being pivotally attached to the body for horizontal swinging movement to steer the vehicle, and including an electric motor in driving relation therewith for propelling the vehicle. Power to actuate the motor is supplied by storage batteries which are mounted below the body deck between the rear wheels and the front wheel assembly and concealed from view in the drawings by side panels 4.

A platform or step 5, for the operator to stand upon, is attached to the forward end of the body and a control pillar 6 centrally disposed at the forward end of the body, has control levers 7 and 8 thereon adapted to be conveniently controlled by the operator while standing on the platform 5. Thus the levers 7 and 8 normally extend forwardly from opposite sides of the pillar 6 so that an operator standing on the step 5 immediately in front of the pillar 6 and facing either forwardly or rearwardly can conveniently grasp the levers 7 and 8. Both the levers 7 and 8 are mounted to swing only in vertical planes. A vertical movement of the lever 7 swings the front wheel assembly 3 to steer the vehicle and vertical movement of the lever 8 controls the application of power to the motor. Two control pedals 9 and 10, respectively, are conveniently positioned above the step 5 for actuation by the operator. The pedal 10 is a brake pedal which controls hydraulically or mechanically actuated brakes on the rear wheel 2 and the pedal 9 is a safety control which permits application of power to the drive wheels only when it is in depressed position. When operating the truck, the operator normally stands on the pedal 9 to retain it in depressed position. The operator can immediately shut off the motive power by releasing the pedal 9 independently of actuation of the lever 8. Furthermore, should the operator accidentally fall off the truck, the pedal 9 would be automatically released to cut off the power.

A particular advantage of the structure briefly outlined, is that it permits a substantial reduction in the weight of the vehicle so that it is capable of handling a relatively large, useful, or pay load. This light weight is obtained in part by the use of a rectangular supporting frame for the body 1, which frame extends all the way around the margin of the body, and directly supports a flat deck member 13. The frame member 12 may be of relatively light gauge steel folded into tubular members of closed rectangular cross section and provided at the outer edge with an upstanding bead or lip for retaining the deck 13. The deck 13 may be of ply board construction. A lower deck 14, supported by side frame members 15 attached to the main frame members 12 of the vehicle, serves to support the storage batteries which supply motive energy for the vehicle.

The rear wheels 2 are mounted on an axle 17 which is supported at opposite ends by brackets 18 which extend downwardly from the frame member 12. The rear wheels 2 are preferably mounted on the axle 17 with antifriction bearings of any well-known type, and are freely floating. That is, each rear wheel turns freely independently of the other. The two rear wheels 2 are relatively widely spaced to contribute stability to the vehicle. However, the axle 17 and the brackets 18 do not extend laterally beyond the chassis.

For the purpose of braking the vehicle, any suitable type of brakes may be mounted on the rear wheels 2. I find it convenient in practice to employ hydraulic brakes under the control of the pedal 10, previously mentioned. Since the details of hydraulic brake systems are well known, they need not be described herein.

Figures 5, 8:
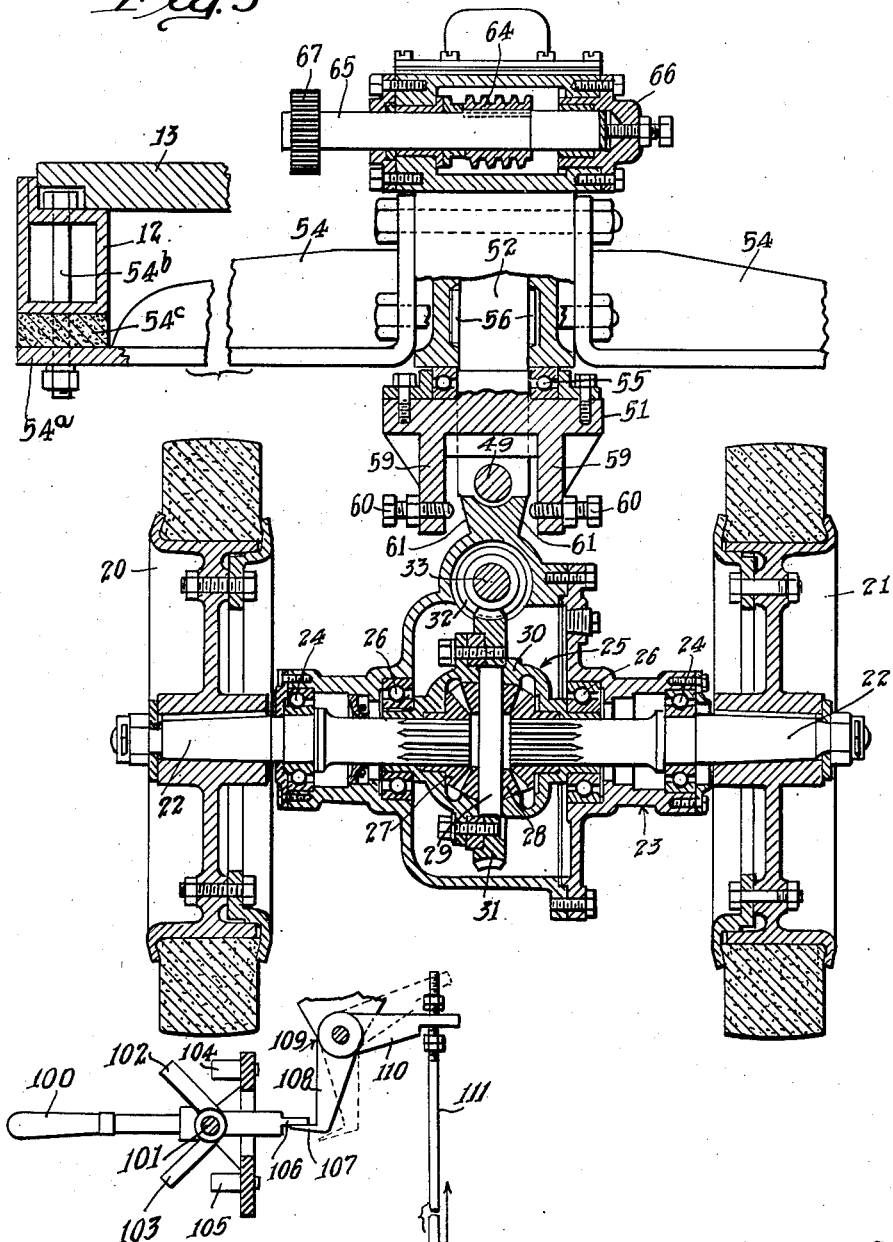
Fig. 5 is an enlarged vertical sectional view showing the driving and steering wheel assembly of the truck.
Fig. 8 is a skeleton view showing the interlock mechanism between the brake and the reversing lever.
Figure 6:
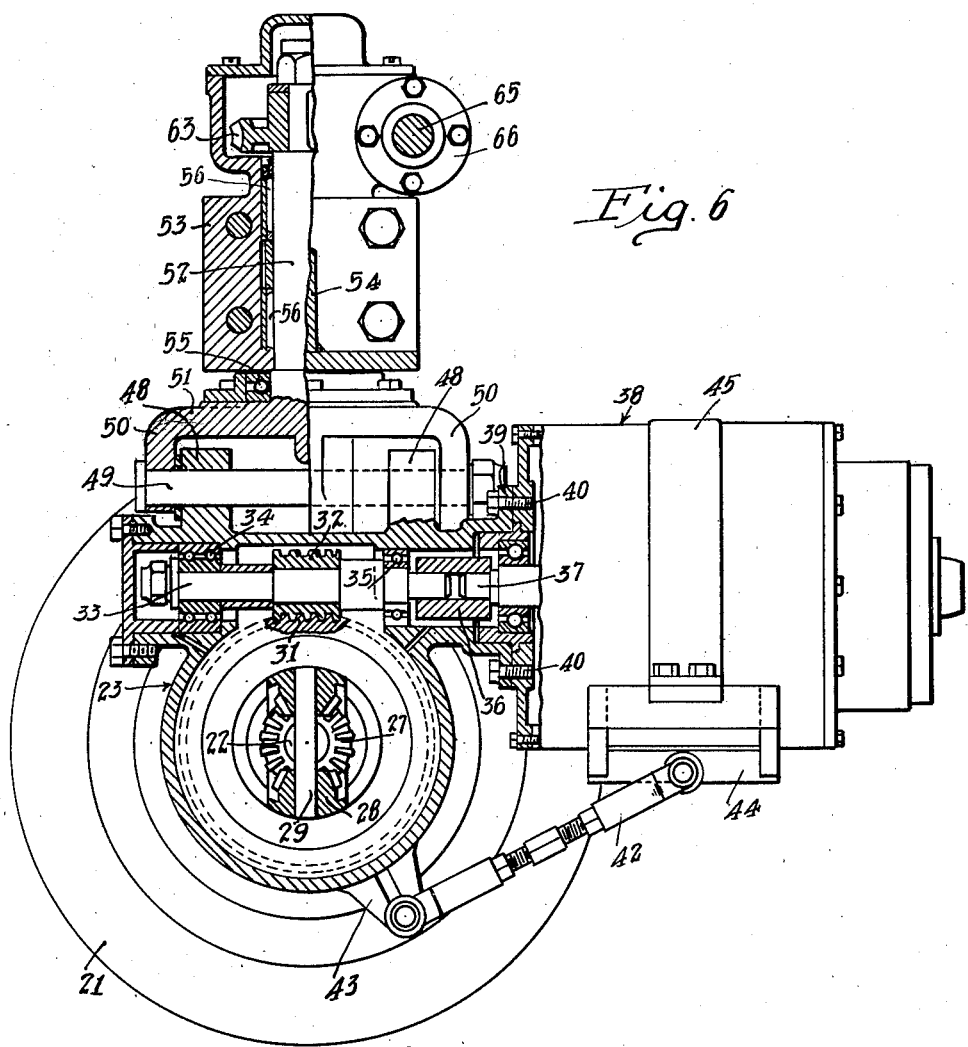
Fig. 6 is an enlarged side view, partly in section, of the driving and steering wheel assembly.

As previously indicated, the front wheel assembly 3 is dirigibly mounted as a whole on the body 1. Referring to Figs. 5 and 6, the front wheel assembly comprises a pair of wheels 20 and 21 which are rigidly mounted on axle shafts 22, which extend into opposite sides of an axle housing 23. Each axle 22 is rotatably supported in the housing 23 adjacent its attached wheel by an antifriction bearing 24. At its inner end, each of the axles 22 is radially supported by a differential mechanism 25 of the type commonly employed in motor cars, the differential unit itself being rotatably supported in the housing 23 by a pair of antifriction bearings 26. The differential unit comprises a pair of bevel gears 27 each splined on the inner end of one of the axle shafts 22. The gears 27 mesh with bevel gears 28 which are rotatably mounted on a shaft 29 mounted in a differential carrier 30. Secured to the carrier 30 is a wormwheel 31 meshing with a worm 32 which is mounted on a drive shaft 33 rotatably supported by antifriction bearings 34 and 35.

The drive shaft 33 is connected by a coupling member 36 to the shaft 37 of an electric motor 38 which is rigidly mounted on the axle housing 23. Thus the housing may be provided with a flange 39 to which the housing of the motor 38 is rigidly secured by cap screws or studs. To brace the motor and reduce the strain on the connecting flange 39 due to the weight of the motor, an adjustable brace 42 is preferably connected between the lower portion of the motor frame and a bracket 43 on the axle housing 23. In the particular construction shown in Fig. 6, the brace 42 is attached to a bracket 44 which in turn is secured to the motor 38 by a band 45.

It will be apparent from the construction so far described that the electric motor 38 is rigidly mounted on the front axle housing and that the motor shaft is permanently connected in driving relation with the axle shaft and the front wheels through the worm drive and differential 25.

To attach the front wheel assembly in supporting and steering relation with the body 1, the housing 23 is provided with a pair of upstanding longitudinally displaced ears 48 having apertures therein for receiving a bearing shaft or bolt 49 which also passes through apertures in a pair of downwardly depending ears 50 on a block 51 which has formed integrally therewith and extending upwardly therefrom, a kingpin 52. The kingpin 52 extends upwardly through an aperture provided therefor in a stationary block 53 which has bolted to it a pair of frame members 54 extending laterally therefrom and connecting at their outer ends to the side frame members 12 of the body.

Thus the frame members 54 may terminate at their outer ends in flat plates 54a of substantial width (in direction fore and aft of the vehicle) positioned below the side members of the frame 12 and secured thereto by bolts 54b. Rubber cushions 54c are preferably interposed between the plates 54a and the frame 12 to reduce the transmission of shocks from the front wheel assembly to the body.

The member 51 and the kingpin 52 are preferably freely rotatable with respect to the block 53, and to this end an antifriction thrust bearing 55 is provided between members 51 and 53, and radial antifriction bearings 56 are provided between the kingpin 52 and the block 53. To steer the vehicle, the kingpin 52 is turned by mechanism to be described later. The reason for connecting the axle housing 23 to the kingpin 52 through the shaft 49 is to permit limited rocking motion of the entire front wheel assembly, and thereby prevent lifting of either of the wheels 20 or 21 clear of the ground when the latter is not perfectly level. Such lifting of one of the wheels would be highly objectionable by reason of the differential drive between the motor and the wheels which would result in a loss of traction should either wheel be clear of the ground. However, it is desirable to limit the extent of rocking motion of the wheel assembly about the shaft 49 and to this end the member 51 is provided with a pair of oppositely disposed downwardly extending ears or lugs 59 having adjusting bolts 60 threaded therein, the inner ends of the bolts 60 being adapted to contact faces 61 on the axle housing when the rocking motion of the latter about the shaft 49 exceeds a predetermined magnitude.

To rotate the kingpin 52 and thereby apply steering motion to the front wheel assembly 3, the kingpin 52 has keyed to its upper end a wormwheel 63 which meshes with a worm 64 keyed to a cross shaft 65 rotatably supported in a housing 66 which is formed in the upper end of the member 53. This cross shaft 65 has on its outer end exterior of the housing 66 a pinion 67 which meshes with a gear segment 68 (Fig. 1) rotatably mounted on a shaft 69 in the control pillar 6. The gear segment 68 is connected by a link 70 to a crank-arm 71 which is attached to a shaft or hub 72 rotatably supported by a journal 73 in the pillar 6. The control lever 7 is rigidly connected to the outer end of the hub 72 so that vertical movement of the lever 7 moves the crank 71, the link 70 and the gear segment 68 to rotate the pinion 67 which in turn rotates the worm 64 to shift the wormwheel 63 and the kingpin 52.

Although other methods of linking the supporting lever 7 to the kingpin 52 might be employed, I find it highly desirable to employ the wormwheel 63 and the worm 64 as a part of this coupling mechanism since it tends to a large extent to make the steering gear irreversible and thereby greatly reduces the transmission of shock from the front wheels to the steering handle 7 when the wheels strike obstructions.

As previously indicated, the control lever 8 controls the application of power to the front wheel assembly. Since, as also previously stated, the electric motor is permanently coupled in driving relation to the front wheels, the control of driving power to the front wheels is had by control of the current applied from the storage battery to the motor. Many types of switch controllers for so applying current from a battery or other source to a motor so as to develop different torques in the motor are well known, and they need not be described in detail herein, since they do not constitute a part of the present invention. Suffice it to say that application of current from the battery to the motor in various ways may be effected by a controller employing a rotatable drum 75 (Figs. 2 and 3) having switch segments thereon cooperating with a plurality of brushes 76, only a portion of which are shown in the drawings. In accordance with well known practice, the contacts on the drums 75 may be so arranged as to cut off all current to the motor when the drum is in one extreme position of rotation and to progressively apply current to the motor in different ways to develop increasing torques in the motor as the drum is rotated away from its initial position.

The drum 75 is constantly urged into its "off" position by a clock spring 77 inserted in a recess in one end thereof, so that unless positively retained in some other position, the drum automatically returns to off position. To provide for displacement of the drum from its off position, it is coupled to the control lever 8 through a mechanism including a safety clutch. Thus the drum 75 is provided on the end opposite the spring 77 with a spur gear 78 meshing with a larger spur gear 79 (Fig. 4), which is freely rotatably supported on a shaft 80 and has a hub 81 rigidly attached thereto. The hub 81 has a pin 82 projecting therefrom on the side opposite the gear 79, which pin extends into an aperture 83 provided therefor in a clutch member 84 which is freely floating on the shaft 80. Keyed to the shaft 80 on the opposite side of the clutch member 84 is a hub member 85 having a pin 86 therein which projects toward the clutch member 84 and is also receivable within the aperture 83 in the clutch member. The hub member 85 has rigidly attached thereto the control lever 8. As previously indicated, the clutch member 84 floats freely on the shaft 80 and is movable longitudinally therealong. However, it is constrained to rotate with the hub member 81 by the pin 82 which is always engaged in the aperture 83 therein. As shown in Fig. 4, the clutch member 84 is in an extreme left position, in which it is cleared of the pin 86 in the hub 85 secured to the control handle 8. However, by moving the clutch member 84 along the shaft 80 while the aperture 83 is aligned with the pin 86, the latter can enter into the aperture, under which conditions the clutch member 84 constrains the members 81 and 85 to rotate in unison. Thereafter movement of the control handle 8 will shift the drum 75 to control the application of current to the motor.

The clutch member 84 is controlled by the pedal 9 previously mentioned. Thus the clutch member 84 has a groove 87 therein engaged by pins 88 in a yoke 89 on one end of a bellcrank lever 90 fulcrumed to the frame of the control pillar on a pin 91. The bellcrank lever 90 has a second substantially horizontally extending arm having an aperture 92 therein, through which a control rod 93 extends. This control rod 93 extends downwardly from the bellcrank lever and is connected at its lower end to the rear end of a lever 95 on the pedal 9. A suitable coil tension spring 96 normally maintains the rod 93 in lowermost position and the pedal 9 in raised or neutral position. In the lowermost position of the rod 93 a head 97 on the upper end thereof engages against the upper side of the associated arm on the bellcrank 90, thereby retaining the clutch 84 in the disengaged position, as shown in Fig. 4. However, when the operator steps upon the pedal 9, the rod 93 is raised against the force exerted by the spring 96 and carries the head 97 away from the bellcrank lever, permitting the latter to rock clockwise (the direction being taken with reference to Fig. 4) and engaging the pin 86 in the aperture 83, provided the pin and aperture are in alignment.

A coil compression spring 98 is provided surrounding the rod 93 immediately below the bellcrank lever 90 and compressed between the lower face of the associated arm of the bellcrank lever and a shoulder 99 on the rod 93. This spring urges the bellcrank lever 90 to rotate clockwise in response to upward motion of the rod 93 so that if the pin 86 is aligned with the aperture 83 in the clutch member 84, the latter will move to the right and the clutch will be engaged in response to downward motion of the pedal 9. However, if the pin 86 should be out of alignment with the aperture 83 at the time the pedal 9 is depressed, then the spring 98 yields but applies a constant force to the clutch member 84, causing it to move to the right if and when the control handle 8 is moved to bring the pin 86 in registration with the aperture 83.

A full understanding of the operation of the clutch mechanism described may be had from the following brief description of a typical operation:

The operator first steps upon the pedal 9 and shifts the lever 8 into neutral position, whereupon the clutch 84, under the force exerted by the compressed spring 98 is moved to the right into position in which it engages both the pin 82 and the pin 86, thereby locking the hub 81 for rotation with the hub 85. The operator then moves the handle 8 to start the truck, this movement rotating the drum 75 into proper position to complete connection to the motor. As the truck accelerates the operator moves the handle 8 further to increase the speed, exactly as the motorman of an electric car moves his control lever. The operator may, when he desires to stop the truck or slow it down, move the control handle back into neutral position, or into a low speed position. However, should the operator desire to make an emergency stop, he lifts his foot off the pedal 9. Thereupon the spring 96 retracts the rod 93 and positively shifts the clutch element 84 into leftmost position, thereby disengaging the pin 86 from the clutch member. Thereupon the control drum 75 is released from connection with the handle 8 and the spring 77 is effective to retract the drum into neutral position in which the current supplied to the motor is cut off. When the operator wishes to start the truck again, he steps on the pedal 9 which immediately re-engages the clutch 84 with the pin 86 if the control handle 8 is in neutral position. Of course if the control handle 8 is not in neutral position, then the operator must move it into that position, as previously described, before the clutch will re-engage and connect the control handle to the drum 75.

It is convenient to arrange the handle 8 so that its lowermost position, as shown in Fig. 1, is its neutral position. With this arrangement, the weight of the handle automatically restores it to neutral position when it is released by the operator. It is important to note that under all conditions of operation it is impossible to engage the clutch 84 with the pin 86, except when the handle 8 is in neutral position, since, when the clutch is released, the drum 75 is always restored to neutral position by its spring 77.

The pedals 9 and 10 are preferably positioned relatively close together so that they will be operated by the same foot. This insures that the operator will always release the pedal 9, thereby cutting off the current to the motor, before applying the brake.

By virtue of the fact that the handles 7 and 8 can move only in vertical planes, and cannot more horizontally, they are very effective in steadying the operator. Thus when the operator turns the truck sharply while it is travelling, the centrifugal force would tend to throw his body laterally with respect to the truck, but by virtue of the fact that he is grasping the handles 7 and 8 in both hands and the handles are immovable laterally, he can readily retain his erect position. Likewise, when making a sudden stop, the operator can prevent himself from being thrown off the truck by hanging on to the handles. Since the forces applied by the operator to the handles, in retaining his erect position, are all in a horizontal direction, they do not tend to move the control handles in a way to either change the direction of movement of the truck or its speed.

The kingpin 52 is preferably mounted vertically so that there is no castor effect on the front wheel assembly. This permits movement of the truck with equal facility, either forward or backward. It is, of course, very simple to reverse the direction of an electric motor, and a switch handle for this purpose is shown mounted on the pillar 6, as indicated at 100.

Normally it is desirable to operate the truck in forward direction, and under such condition the operator stands on the step 5 facing forwardly with his back to the control pillar 6 and grasps the speed conterol handle 8 in his left hand, and the steering lever 7 in his right hand. If he wishes to operate the truck in reverse direction, he simply manipulates the reversing switch 100 and then operates the truck while standing on the platform 5, facing the control pillar 6 and grasping the steering lever 7 in his left hand and the speed controlling lever 8 in his right hand.

I preferably provide an interlock between the reversing lever 100 and the brake pedal 10 to prevent application of power to the motor in such a way as to reverse the direction of motion of the truck, without first bringing the truck to a standstill. Application of power to the motor in reversing direction while the motor is running would impose sereve strains thereon and draw a heavy current from the battery. With the interlock to be described, it is impossible to throw the lever 100 from forward position to reversing position, or from reversing position to forward position except while the brake pedal 10 is depressed.

Thus referring to Figs 1 and 8, the lever 100 is mounted for oscillation in a vertical plane about a pivot point 101 and has attached thereto switch blades 102 and 103, respectively, which cooperate with the stationary switch levers 104 and 105, respectively. As shown in Figs. 1 and 8, the lever 100 is in neutral position, in which all the switch contacts are open. In this position all current is cut off from the motor independently of the controller previously described. When the switch 100 is in uppermost position, the switch blade 102 closes on the switch levers 104 and completes the circuit from the battery to the motor through the controller in such direction as to run the motor in a forward direction. When the switch handle 100 is in lowermost position, the switch blades 103 close on the switch levers 105 and complete the circuit from the battery to the motor, through the controller, in such direction as to drive the motor in reverse direction. The circuits involved for reversing the direction of the motor are well known and need not be described here.

The interlock mechanism between the switch handle 100 and the brake pedal 10 includes an extension 106 on the reversing lever 100 and a stop member 107 on one arm 108 of a bellcrank lever 109 which is fulcrumed to the frame. The other arm 110 of the bellcrank lever 109 is connected by a link 111 to an extension 112 on the brake pedal 10.

When the brake pedal is in released, or uppermost position, as shown in Figs. 1 and 2, the extension 112 on the pedal is in lowermost position, in which the stop 107 on the bellcrank lever 109 is in the path of the extension 106 on the reversing lever 100. In the particular position of the parts as shown in Fig. 8, the stop 107 prevents upward movement of the lever 100 to drive the truck in forward direction. However, the lever 100 can be moved from neutral position into reverse position, in which the switch blades 103 engage the switch blades 105 and apply current to the motor in such a way as to drive it in reverse direction. If the operator desires to drive the truck in forward direction, he must step on the brake pedal 10 and depress the latter a sufficient distance to raise the link 111 and oscillate the bellcrank lever 109 into the position shown in dotted lines in Fig. 8, in which position the stop 107 is clear of the path of movement of the extension 106 on the lever 109. The operator can then lift the lever 100 to engage the switch blades 102 with the switch blades 104 and thereby condition the motor for forward operation. Of course after shifting the control lever 100 as described, the operator releases the brake pedal 10 before shifting the control lever 8 to complete the application of current to the motor. The operator can at any time open the motor circuit either by manipulating the control lever 8 or by throwing the reversing lever 100 into neutral position, but he cannot throw the reversing lever from one extreme position to the other and reverse the direction of the motor without first depressing the brake pedal 10, which means that the truck must be brought to a full stop before power can be applied to run it in the reverse direction.

The mounting of the entire driving and steering mechanism on the front end of the truck with direct control leading therefrom to the control pillar 6, makes it possible to employ the driving and steering assembly with body constructions of various lengths without introducing any complications whatsoever in the assembly.

By virtue of the fact that the batteries are mounted below that portion of the truck deck which is clear of any superstructure, the battery may be made readily accessible by providing a removable panel or trap-door in the deck immediately above the battery.

The location of the control pillar centrally of the deck with substantial clear space on each side thereof, permits the loading of long pieces of material on each side of the deck with the ends of the pieces projecting beyond the deck at both front and rear ends.

For the purpose of explaining the invention, a particular embodiment thereof has been described in detail. It is to be understood, however, that various departures from the particular construction shown may be made without departing from the invention, and the latter is to be limited only to the extent set forth in the appended claims.

I claim:

1. A vehicle of the type described comprising a substantially flat load-supporting deck, a pair of laterally spaced apart supporting wheels in supporting relation to said deck below one end thereof and positioned entirely below the plane of said deck, steering and driving wheel means centrally positioned below said deck adjacent the opposite end thereof, a control column rising from said deck above said steering and driving wheel means and being substantially narrower than said deck and positioned closely adjacent the forward end thereof, and means on said column for controlling said steering and driving means, said deck being unobstructed laterally and rearwardly of said control column, whereby loads supported on the side portions of the deck can project therebeyond at both the front and rear ends.

2. A power truck comprising a body having a pair of side frame members, a pair of non-dirigible rear wheels attached to said body for supporting the rear end thereof, a carriage positioned below the front of said body, said carriage having a driving wheel assembly and power means rigidly mounted on said carriage for driving said driving wheel assembly, a cross member above said carriage, and cushion means connecting the ends of said cross member to said side frame members, and means pivotally mounting said carriage on said cross member for steering motion.

3. A vehicle of the type described, comprising a substantially flat load-supporting deck, a pair of laterally spaced supporting wheels in supporting relation to said deck below one end thereof, steering and driving wheel means centrally positioned below said deck adjacent the opposite end thereof, a control column rising from said deck above said steering and driving wheel means and being substantially narrower than said deck and positioned closely adjacent said opposite end thereof, control means extending from said column for controlling said steering and driving means, and means completely contained within said column responsive to said control means for actuating the steering of said steering and driving wheel means, said steering and driving wheel means including a truck having motor means thereon for driving said wheels, and said truck being rotatably supported with respect to said deck for steering movement and having a shaft extending vertically through said deck into said control column, a wormwheel on said shaft within said column, a horizontal wormshaft and a worm thereon meshing with said wormwheel, a pinion on said wormshaft, a gear member in said control column meshing with said pinion, a crankpin connected with said gear member, said control means extending from said column for steering said vehicle comprising a control lever mounted for vertical swinging movement, and a connecting rod coupling said lever to said crankpin.

ETHAN C. Le MUNYON.